July 15, 1958   W. P. STAKER ET AL   2,843,755
RADIOACTIVE INSPECTION OF HOUSINGS
Filed Sept. 27, 1954
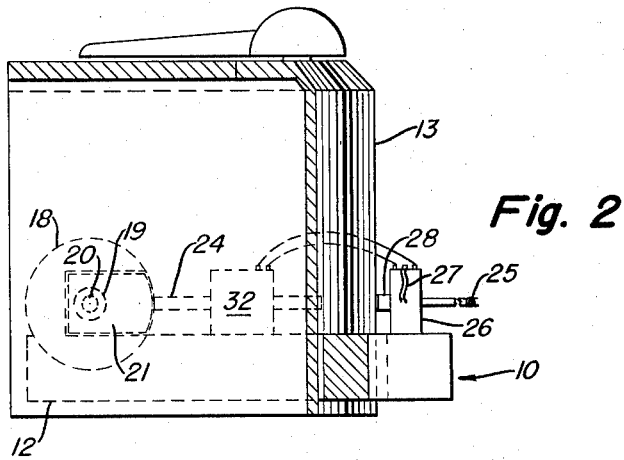
Fig. 2
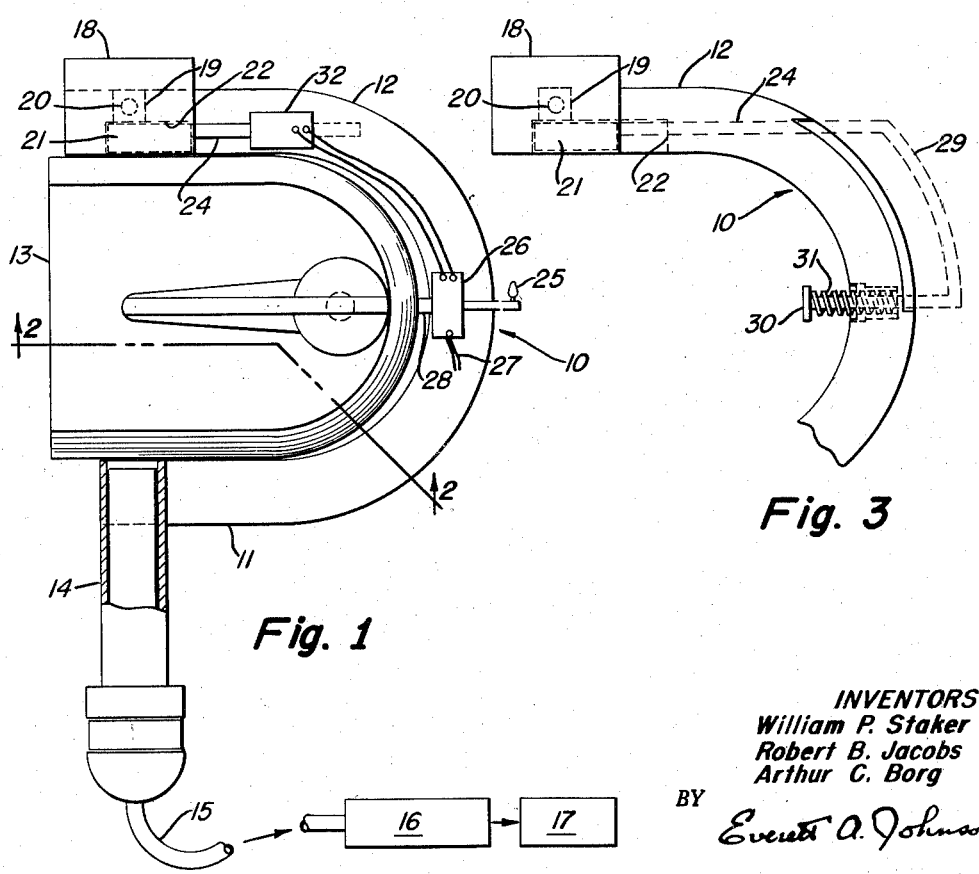
Fig. 1
Fig. 3
INVENTORS:
William P. Staker
Robert B. Jacobs
Arthur C. Borg
BY Everett A. Johnson
ATTORNEY

United States Patent Office 2,843,755
Patented July 15, 1958

2,843,755

RADIOACTIVE INSPECTION OF HOUSINGS

William P. Staker and Robert B. Jacobs, Homewood, and Arthur C. Borg, Chicago, Ill., assignors to Standard Oil Company, Chicago, Ill., a corporation of Indiana Application September 27, 1954, Serial No. 458,478

4 Claims. (Cl. 250—106)

This invention relates to radioactive measuring and particularly to a system in which penetrating radiation, such as gamma rays, is caused to pass through a hollow object to a radiation detector placed at the opposite side of the object. More specifically, the invention relates to apparatus for inspecting such a hollow object to ascertain whether it contains a particular material.

In the fabrication of lubricated equipment of the sealed variety, it is not possible by ordinary inspection techniques to detect after complete assembly whether the lubricant has, in fact, been placed in the housing. We have devised a "go or no-go" gauge which will sound an alarm if the lubricant is absent.

An object of the invention is to provide a device for detecting whether a desired material is within a closed opaque system. Another object of the invention is to provide a simple yet fool-proof device for inspecting enclosed lubricant housings in a uniform and routine manner. Still another object of our invention is to provide a device for automatically indicating whether grease is absent from a gear housing. These and other objects of our invention will become apparent as our descriptions of preferred embodiments proceed.

Briefly, our invention comprises a yoke adapted to embrace the object to be inspected; a radiation source is mounted on one leg of the yoke and on the opposite leg we provide a detector. A shutter for the source is automatically operated so that the source is never exposed when the yoke is not on the housing. Electrical or mechanical shutter-actuator means are provided for automatically withdrawing the shutter upon placing the yoke about the housing. An alarm circuit, responsive to a count-rate meter energized by the detector, indicates whether the housing is properly filled with grease or empty.

Further details of construction and additional advantages of our apparatus will be described in connection with preferred embodiments thereof illustrated in the drawing wherein:

Figure 1 is a plan view of one embodiment of the invention;

Figure 2 is a fragmentary side view of the apparatus in Figure 1; and

Figure 3 is a fragmentary plan view illustrating another embodiment of the shutter-actuating mechanism.

Referring to the drawing, the device comprises a bifurcated yoke 10 which is of generally U-shape and has a span between legs 11 and 12 which is slightly greater than the width of the housing 13 to be inspected. On one leg 11 of the yoke 10 is a detector such as a Geiger counter 14, the impulses from which are fed by cables 15 to a rate meter 16 which in turn actuates the alarm 17 when the counting rate is above the characteristic rate for the grease-filled housing 13. A shield 18 is fixed to the opposite leg 12 of the yoke 10 and is provided with a cavity 19 which accommodates the radioactive source 20.

To prevent unintentional exposure of the source 20, we provide in cavity 22 a retractable shutter means 21 having rod 24 which is automatically withdrawn by a shutter actuator means which is rendered operative only when the yoke 10 is in place about the object to be inspected. Two forms of shutter actuator means are shown in the drawings.

The source 21, preferably one millicurie of cesium-137, is selected because of its relatively long half-life (37 years) and because of its low energy radiation. The long half-life eliminates the need of early replacement and also makes unnecessary corrections in the measured rates to allow for decay. Likewise, the low energy of radiation gives a greater percentage attenuation by grease in the housing 13. We have found that with cesium-137, gamma radiation is attenuated to about 60% of its original value by the presence of grease, whereas gamma radiation from a radium source is reduced to about 70% and there is therefore reduction in sensitivity.

Figure 1 schematically shows a preferred embodiment of the arrangement of the yoke 10 with the location of Geiger counter 14, the source shield 18, source 20, movable shutter 21 in cavity 22, and alarm 17. The lead shutter 21, necessary in order to keep the alarm 17 from operating when no absorber is between the source 20 and the Geiger counter 14, may be a lead block about 0.5 inch thick and about 0.75 inch square. The shield 18 may comprise a lead cylinder 2 inches long by 2 inches in diameter with the source cavity 19 about 1 inch deep and 0.5 inch in diameter and the shutter cavity 22 about 0.75 inch wide, 0.5 inch deep and 1.25 inch long.

The detector 14 is preferably a stainless steel Geiger counter having a small window to provide a small target for the desired gamma ray beam from source 20. One such detector 14 is identified as Nuclear-Chicago 90 NB which is offered by Nuclear Instrument and Chemical Corp., Chicago, Illinois. The rate meter 16 yields the desired information in about two seconds and may be, for example, a rate meter identified as Nuclear-Chicago Model 1615–B which is also available from the Nuclear Instrument and Chemical Corp. A Model MR–10 alarm circuit 17, also of Nuclear-Chicago, is connected to the output of the rate meter 16 and can be used to energize a suitable alarm when no grease is present in the housing 13. Such an alarm circuit 17 remains operative after it has been triggered until manually shut off.

In Figure 1, the shutter 21 is electrically operated by an actuator means comprising solenoid 32 acting on the soft iron core 24 which is fixed to the shutter 21. Leads 27 are connected to a power source (not shown) and enter the switch 26 which is actuated by contact button 28. Upon closing the switch 26 the solenoid 32 is energized thereby withdrawing the shutter 21 and simultaneously the indicator light 25 is lit to show that the yoke 10 is in proper place and that the source 20 has been exposed by the withdrawal of the shutter 21.

In Figure 3, the shutter 21 is mechanically operated by an actuator means comprising the linkage 29 fixed to rod 24 and terminating in stem 30 having spring 31 for urging the shutter 21 into a shielding position.

From the above, it will be apparent that we have provided an apparatus for attaining the objects of the invention whereby the absence of a lubricant in a sealed gear housing can be readily detected in a routine manner without specific technical training of the operator. The construction of the apparatus is such that its operation is fool proof, it becoming effective as a detector or meter only upon the application thereof to the particular housing. In this connection, it will be appreciated that other shapes of yokes and different locations of the shutter-actuator may be dictated by the configuration of the particular housing which is to be inspected.

Although we have described our invention with reference to a preferred embodiment thereof, it should be understood that this is by way of illustration only. In any event, modifications in the apparatus and in the techniques will become apparent to those skilled in the art and can be made without departing from the spirit and scope of the invention.

What we claim is:

1. An apparatus for inspecting a sealed gear housing for the presence of lubricant therein comprising in combination a gamma radiation source means, a radiation detector means, a bifurcated yoke means, said bifurcated yoke means having substantially parallel legs with a connecting base portion, one of said legs supporting said source means and the other of said legs supporting said detector means on opposite sides of such a housing, a shutter for said source means, and shutter-actuating means carried by said yoke means which is rendered operative by placing the yoke means on such housing.

2. An apparatus for inspecting a sealed gear housing for the presence of lubricant therein comprising in combination a bifurcated yoke means having substantially parallel legs and a connecting base portion, a gamma radiation source means supported on one of said legs, a radiation detector means supported by the other of said legs whereby said source means and said detector means are disposed on opposite sides of such a housing, a shutter for said source means, a shutter actuating means carried by said base portion of said yoke means which is rendered operative by placing the yoke means about such housing, the said shutter actuating means including a solenoid means for moving said shutter, a switch means carried by said yoke means, and an exposed contact button normally extending inwardly of said yoke means and closing said switch means to energize said solenoid means and withdraw said shutter to expose said source means.

3. The apparatus of claim 1 wherein the shutter-actuating means includes a spring-loaded contact rod, and a rigid linkage between said shutter and said contact rod whereby depressing the spring-loaded rod into said yoke withdraws the shutter to expose the source.

4. An apparatus for ascertaining whether a material is present in a hollow object, the improvement which comprises a bifurcated yoke means having substantially parallel legs, a shielded radiation source means carried by one of said legs, a detector means carried by the other of such legs in the path of the beam from said source means, a movable shutter means for said source means, a shutter-actuator means carried by said yoke means, a trigger means for said actuator extending between said legs, and means rendered operative by said actuator means for moving said shutter means to expose the source to said detector means.

References Cited in the file of this patent

UNITED STATES PATENTS

| | | |
|---|---|---|
| 2,486,902 | Wolf | Nov. 1, 1949 |
| 2,593,526 | Bell et al. | Apr. 22, 1952 |
| 2,670,443 | Pennock et al. | Feb. 23, 1954 |